United States Patent [19]

Brown

[11] 4,179,163
[45] Dec. 18, 1979

[54] SIMULATED WIRE SPOKE WHEEL ASSEMBLY

[75] Inventor: Raymond C. Brown, Tarzana, Calif.

[73] Assignee: Superior Industries International, Inc., Van Nuys, Calif.

[21] Appl. No.: 963,952

[22] Filed: Nov. 27, 1978

Related U.S. Application Data

[63] Continuation of Ser. No. 875,444, Feb. 6, 1978, abandoned.

[51] Int. Cl.² .............................................. B60B 7/04
[52] U.S. Cl. .............................. 301/37 SS; 301/37 SC
[58] Field of Search ............. 301/37 R, 37 SS, 37 SA, 301/37 AT, 37 S, 37 SC, 108 SC

[56] References Cited

U.S. PATENT DOCUMENTS

| | | | |
|---|---|---|---|
| 2,693,394 | 11/1954 | Gamet | 301/37 SS |
| 2,712,474 | 7/1955 | Gaylord | 301/37 SS |
| 2,713,513 | 7/1955 | Lyon | 301/37 SS |
| 2,809,075 | 10/1957 | Lyon | 301/37 SS |
| 3,294,452 | 12/1966 | Schmidt et al. | 301/37 SS |
| 3,989,306 | 11/1976 | Buerger | 301/37 CM |
| 4,061,400 | 12/1977 | D'Angelo | 301/37 AT |

FOREIGN PATENT DOCUMENTS 942654  11/1963  United Kingdom ................ 301/37 SC Primary Examiner—Charles A. Marmor
Attorney, Agent, or Firm—Fulwider, Patton, Rieber, Lee & Utecht

[57] ABSTRACT

A simulated wire spoke wheel assembly for use with a conventional solid steel wheel. The assembly includes a wire spoke basket having a row of inner spokes and a row of outer spokes. Such wire spoke basket is releasably secured to the exterior of a steel wheel by a single bolt extending through an exterior cap. The single bolt retains the entire assembly in place upon the steel wheel. Such assembly may be readily removed when it is desired to change the wheel, as in the event of a flat tire.

7 Claims, 8 Drawing Figures

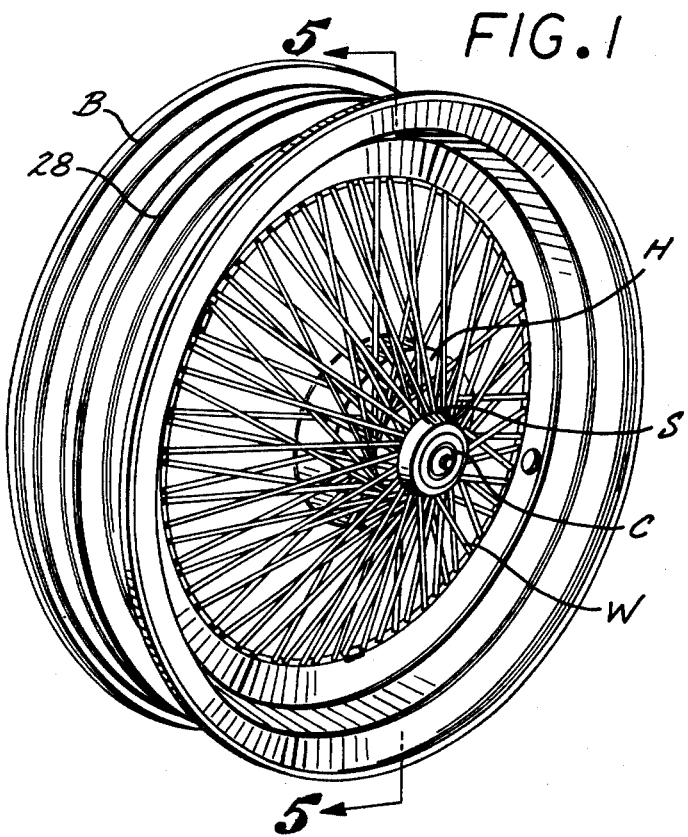
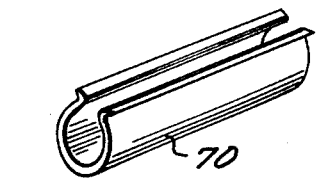
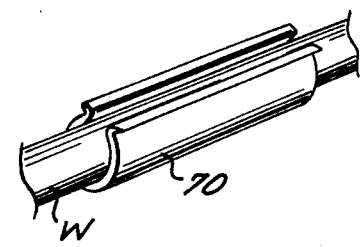
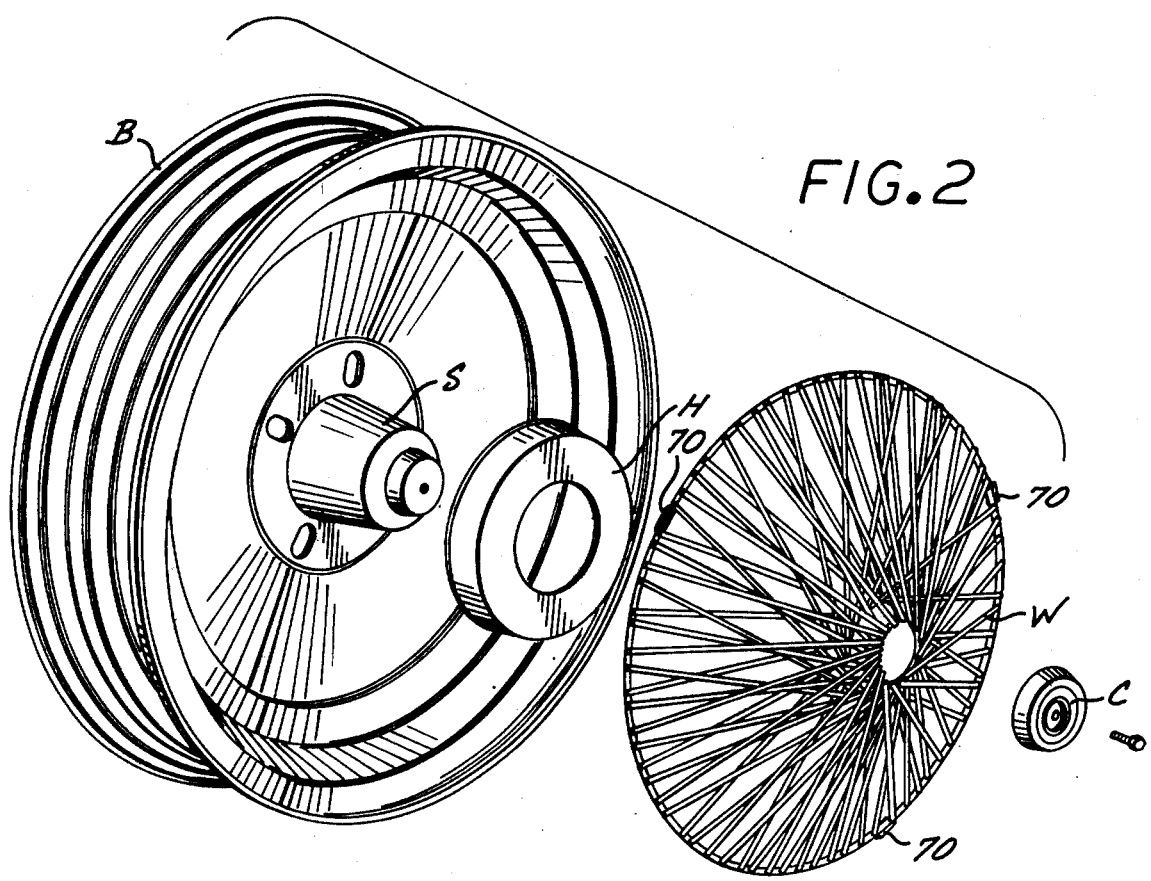

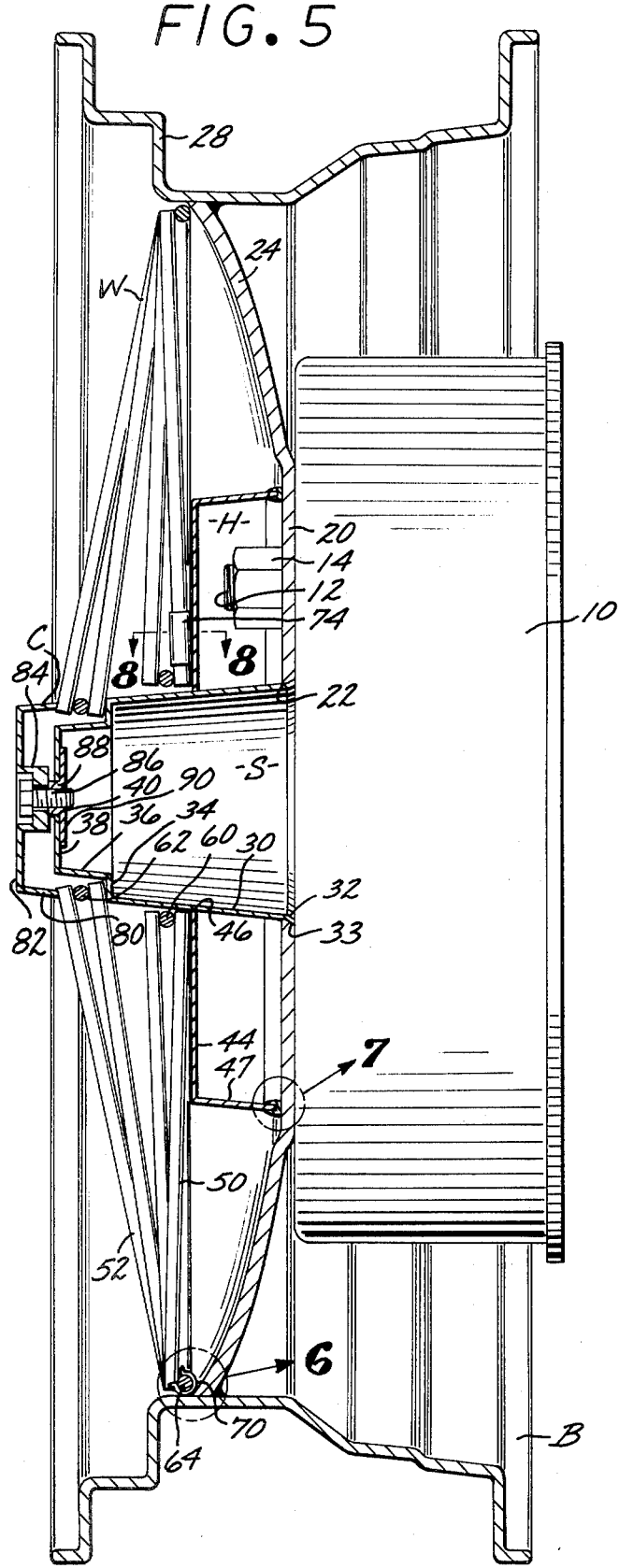
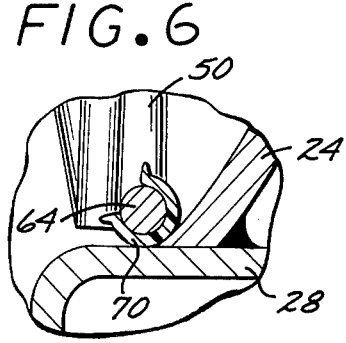
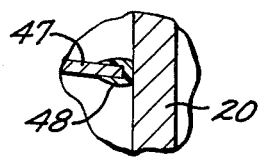
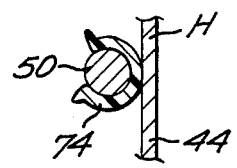

SIMULATED WIRE SPOKE WHEEL ASSEMBLY

This is a continuation of application Ser. No. 875,444, filed Feb. 6, 1978, now abandoned.

BACKGROUND OF THE INVENTION

Authentic automobile wire wheels, while attractive, are both expensive and troublesome to maintain. In an effort to overcome the disadvantages of the authentic wire spoke wheel, many types of wire spoke simulating covers have heretofore been proposed. Such covers, however, have either proven to be expensive and/or failed to adequately simulate the appearance of an authentic wire spoke wheel.

SUMMARY OF THE INVENTION

It is a major object of the present invention to provide a simulated wire spoke wheel assembly for use with a conventional solid wheel body whereby there is combined the security and convenience of a solid wheel construction with the appearance of a authentic wire spoke wheel.

Another object of the present invention is to provide a simulated wire spoke wheel assembly of the aforedescribed nature which is economical of manufacture, rugged of construction, and will afford a long and trouble-free service life.

A further object of the present invention is to provide a simulated wire spoke wheel assembly of the aforedescribed nature which is readily removable from the conventional wheel body by merely disengaging a single bolt to thereby facilitate a tire changing operation.

It is an important object of the present invention to provide a simulated wire spoke wheel assembly of the aforedescribed nature which is comparatively rattle-proof.

Yet a further object of the present invention is to provide a simulated wire spoke wheel assembly of the aforedescribed nature that incorporates a hub cup which protectively encases the solid wheel's lug bolts and lug nuts.

A more particular object of the present invention is to provide a simulated wire spoke wheel assembly of the aforedescribed nature which includes a spider cup coaxially removably seated within the central aperture of the bolt-on-flange of a conventional wheel body, a hub cup telescopically slidably supported by the spider cup so as to protectively cover the lug bolts and lug nuts of such wheel body, a double row wire spoke basket seated upon the spider cup, a cap engaging the outer end of the wire spoke basket and threaded attachment means securing the cap to the outer end of the spider cup, with tightening of such threaded attachment means drawing the cap and the spider cup together and urging the wire spoke basket inwardly against the hub cup and the wheel body.

Other objects and advantages of the present invention will become apparent from the following detailed description taken in conjunction with the accompanying drawings.

BRIEF DESCRIPTION OF THE DRAWINGS

FIG. 1 is a perspective view of a simulated wire spoke wheel assembly embodying the present invention, mounted upon a conventional solid wheel body;

FIG. 2 is a horizontally exploded view of the parts of FIG. 1;

FIG. 3 is a perspective view of a plastic tube adapted to encircle a wire spoke;

FIG. 4 is a perspective view of the plastic tube of FIG. 3 applied to a wire spoke;

FIG. 5 is a vertical sectional view taken in enlarged scale along line 5—5 of FIG. 1;

FIG. 6 is an enlarged view of the encircled area designated 6 in FIG. 5;

FIG. 7 is an enlarged view of the encircled area designated 7 in FIG. 5; and

FIG. 8 is a broken vertical sectional view taken in enlarged scale along line 8—8 in FIG. 5.

DESCRIPTION OF THE PREFERRED EMBODIMENT

Referring to the drawings, there is shown a preferred form of simulated wire spoke wheel assembly embodying the present invention mounted upon a conventional automobile wheel body B. The assembly includes a spider cup S having its inner end coaxially supported relative to wheel body B. A hub cup H which encircles spider cup S, a double row wire spoke basket W which is coaxially carried upon the spider cup S, a cap C coaxial with and engaging the outer end of the wire spoke basket W. Attachment means described in detail hereinafter secure the aforedescribed parts of the wire spoke wheel assembly together upon the wheel body B.

More particularly, as indicated in FIG. 5, the wheel body B is attached to an automobile brake drum housing 10 by means of a plurality of conventional lug bolts 12 and lug nuts 14. The wheel body B includes a bolt-on flange 20 formed with a central aperture 22. The bolt-on flange 20 merges into an attachment flange 24 that projects radially outwardly and forwardly away from bolt-on flange 20. The radially outer portion of the attachment flange 24 is rigidly affixed as by welding to a conventional multi-flange drop center type tire rim 28. The spider cup S includes a main body 30 of frusto-conical configuration, the open end of which is formed with an outwardly flared lip 32 which is coaxially removably seated within a flared seat 33 defining the central aperture 22 of bolt-on flange 20. The outer end of main body 30 is formed with a radial step 34, the radially inner end of which emerges into a frustoconical collar 36 covered by a vertical end wall 38. End wall 38 is coaxially formed with a bore 40.

The hub cup H is telescopically slidably supported upon the intermediate portion of spider cup S with its open end resting against the outer surface of bolt-on flange 20. The outer closed end of the hub cup H is defined by a radially extending wall 44 provided with a coaxial aperture 46. As indicated particularly in FIG. 7, the periphery of the cup's side walls 47 at the cup's open end H is provided with a generally U-shaped ring 48 of a resilient material such as a synthetic rubber or plastic, anti-rattle ring 48 abutting the outer surface of bolt-on flange 20.

The wire spoke basket W includes a row of generally radially extending inner spokes 50 and a row of outer spokes 52 that slope radially rearwardly relative to the axis of rotation of wheel body B. In order to heighten the illusion of an authentic wire spoke wheel, the wire spokes in each of the rows 50 and 52 are crossed. To further heighten such illusion, the outer surface of the bolt-on flange 20 and attachment flange 24 will be chromed, as will the spokes, spider cup and hub cup.

Inner and outer support rings 60 and 62 are affixed respectively to the radially inner ends of the inner and outer rows 50 and 52 of the wire spoke basket B. As shown particularly in FIG. 5, alternate ones of the spokes 50 and 52 will be disposed on the inner and outer sides of such support rings 60 and 62. A peripheral support ring 64 is affixed to the radially outer ends of the inner and outer rows 50 and 52 of the spokes. Referring to FIGS. 2, 5 and 6, a plurality (such as three) of generally U-shaped synthetic plastic anti-rattle pads 70 of like construction are snapped about the outwardly and inwardly facing sides of support ring 64 to engage the wheel body B adjacent the radially outer end of attachment flange 84 at its junction with tire rim 28. Referring now to FIG. 8, it should be noted that a plurality (such as three) similar anti-rattle pads 74 are snapped about the inwardly facing surfaces of some of the inner spokes 50 to abut the outwardly facing surface of wall 44 of hub cup H. Preferably, pads 70 and 74 are equidistantly spaced about the circumference of wire basket W.

Cap C is generally cup-shaped, having truncated frusto-conical side walls 80 which are integral with an end wall 82. The center portion of end wall 82 is formed with an inwardly extending collar 84 which is coaxially bored to receive an attachment bolt 86. The threads of such attachment bolt 86 engage the threaded neck 88 of an annular keeper nut 90.

To assemble the aforedescribed simulated wire spoke wheel assembly, the narrowed outer end of spider S is inserted through bore 22 of bolt-on flange 20 until such spider's lip 32 engages seat 33 of such flange. The spider S will then be locked against further outward movement relative to wheel body B. Next, hub cup H is telescopically applied over spider S until its anti-rattle ring 48 abuts the outer surface of the bolt-on flange. Next, wire basket W is telescopically applied over spider S until its anti-rattle pads 70 and 74 abut the outer surface of hub cup wall 44 and the outer periphery of attachment flange 24 and the adjoining surface of tire rim 28. Next, cap C is coaxially moved towards the outer spokes 54 to engage the outer surfaces thereof. Keeper nut 88 is now held in position coaxial with end wall 38 of spider S to receive the threads of attachment bolt 84. The attachment bolt is then tightened so as to draw cap C and spider cup together and urge wire spoke basket W inwardly against. When the attachment bolt 86 is tightened ring 48 is partially compressed so as to not only prevent rattling of the wire basket, but also to pre-load the threads of attachment bolt 44 and thereby restrain its inadvertent disengagement relative to keeper nut 88. Should it become necessary to remove the wire spoke assembly from wheel body B, however, the attachment bolt is readily unthreaded from such keeper nut. Such cup H serves not only to enhance the appearance of the assembly, but also protects lug bolts 12 and nuts 14 from foreign material, such as dirt, dust and salt brine.

Various modifications and changes may be made with regard to the foregoing detailed description without departing from the spirit of the invention.

I claim:

1. A simulated wire spoke wheel assembly for use with a wheel body having a centrally apertured bolt-on flange that merges into an attachment flange to the radially outer end of which is affixed a tire rim, with the bolt-on flange receiving lug bolts to be engaged by lug nuts, said assembly comprising:

an outwardly extending spider cup having means at its inner end coaxially removably seated within the central aperture of the bolt-on flange so as to be locked against outward movement relative to said bolt-on flange, the outer end of said spider cup having an end wall;

a hub cup telescopically slidably supported upon said spider cup, said hub cup including an open inner end resting against the outer surface of said bolt-on flange radially outwardly of the lug bolt area thereof so as to protectively cover the lug bolts and lug nuts disposed within such lug bolt area;

a wire spoke basket having a row of inner spokes and a row of outer spokes that slope radially rearwardly and inwardly relative to the axis of rotation of the wheel body, the radially inner ends of said outer spokes terminating adjacent the outer end of said spider cup;

inner and outer support rings affixed respectively to the radially inner ends of said inner and outer rows of spokes, said rings being telescopically received by said spider cup;

peripheral support ring means affixed to the radially outer ends of said inner and outer rows of spokes and engaging said wheel body adjacent the intersection of said attachment flange and said tire rim;

a cap coaxial with and telescopically encompassing the end wall of said spider cup; and attachment means interposed between said cap and the end wall of said spider cup which when engaged draw said cap and said spider cup together and urge said wire spoke basket inwardly against said hub cup.

2. A simulated wire spoke wheel assembly as set forth in claim 1 wherein the open inner end of said hub cup is provided with an anti-rattle resilient ring that abuts the outer surface of said bolt-on flange and is compressed when said attachment means is engaged.

3. A simulated wire spoke wheel assembly as set forth in claim 1 wherein said wire basket is provided with anti-rattle pads that engage the wheel body.

4. A simulated wire spoke wheel assembly as set forth in claim 1 wherein said attachment means includes a bolt inserted inwardly through said cap and the end wall of said spider cup, and a keeper nut disposed inwardly of said end wall to be engaged by said bolt.

5. A simulated wire spoke wheel assembly as set forth in claim 2 wherein said wire basket is provided with anti-rattle pads that engage the wheel body.

6. A simulated wire spoke wheel assembly as set forth in claim 2 wherein said attachment means includes a bolt inserted inwardly through said cap and said end wall of said spider cup, and a keeper nut disposed inwardly of said end wall to be engaged by said bolt.

7. A simulated wire spoke wheel assembly as set forth in claim 5 wherein said attachment means includes a bolt inserted inwardly through said cup and said end wall of said spider cup, and a keeper nut disposed inwardly of said end wall to be engaged by said bolt.

* * * * *